United States Patent
Yasuda et al.

(10) Patent No.: US 7,992,011 B2
(45) Date of Patent: Aug. 2, 2011

(54) POWER MANAGEMENT METHOD FOR INFORMATION PLATFORM

(75) Inventors: Yoshiko Yasuda, Tokorozawa (JP); Takashige Baba, Kodaira (JP); Jun Okitsu, Kodaira (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1071 days.

(21) Appl. No.: 11/753,796

(22) Filed: May 25, 2007

(65) Prior Publication Data

US 2007/0277046 A1 Nov. 29, 2007

(30) Foreign Application Priority Data

May 29, 2006 (JP) ................................. 2006-147772

(51) Int. Cl.
*G06F 1/26* (2006.01)
*G06F 1/32* (2006.01)
(52) U.S. Cl. ......... 713/300; 713/320; 713/321; 711/170
(58) Field of Classification Search .................. 713/300, 713/320, 321; 711/170
See application file for complete search history.

(56) References Cited

U.S. PATENT DOCUMENTS

| | | | | |
|---|---|---|---|---|
| 5,583,987 | A * | 12/1996 | Kobayashi et al. | 714/13 |
| 6,625,638 | B1 * | 9/2003 | Kubala et al. | 718/105 |
| 2002/0147932 | A1 * | 10/2002 | Brock et al. | 713/300 |
| 2004/0030941 | A1 | 2/2004 | Barr et al. | |
| 2004/0117536 | A1 | 6/2004 | Franke et al. | |
| 2007/0033369 | A1 * | 2/2007 | Kasama et al. | 711/170 |
| 2007/0168470 | A1 * | 7/2007 | Nonaka et al. | 709/219 |

FOREIGN PATENT DOCUMENTS

| | | |
|---|---|---|
| JP | 2004-78935 | 3/2004 |
| JP | 2004-178598 | 6/2004 |
| JP | 2005-202506 | 7/2005 |

* cited by examiner

*Primary Examiner* — Thomas Lee
*Assistant Examiner* — Michael J Brown
(74) *Attorney, Agent, or Firm* — Brundidge & Stanger, P.C.

(57) ABSTRACT

A power management method for an information platform, includes holding system configuration information indicating a correspondence between a logical system and a processing module constituting the logical system; holding power management information indicating a correspondence between information with which a type of the logical system can be specified, an operating condition of the logical system, and first power consumption for operating the logical system; selecting the processing module which constitutes the logical system specified by a configuration request by referring to the system configuration information when receiving the configuration request of the logical system; calculating the first power consumption for operating the logical system based on the type and the operating condition included in the configuration request, and the power management information; and determining second power consumption to be supplied to the processing module based on the calculated first power consumption and information on the processing modules.

23 Claims, 11 Drawing Sheets

| LOGICAL SYSTEM NUMBER | 1 | 2 | 201 |
|---|---|---|---|
| SYSTEM TYPE | SERVER 1 | SERVER 2 | 202 |
| MODULE IDENTIFIER | 1, 3 | 2, 4 | 203 |

SYSTEM COMPONENT MANAGEMENT TABLE 130

FIG. 2

| SYSTEM TYPE | SERVER 1 | SERVER 2 | 301 |
|---|---|---|---|
| OPERATING CONDITION | HIGH | LOW | 302 |
| PERMISSIBLE POWER | A | B | 303 |

POWER MANAGEMENT TABLE 131

FIG. 3

| PERMISSIBLE POWER FOR MODULE | X1 | X2 | Xmax |
|---|---|---|---|
| PROCESSOR OPERATION FREQUENCY | P1 | P2 | Pmax |
| MEMORY OPERATION FREQUENCY | M1 | M2 | Mmax |
| OPERATION VOLTAGE | V1 | V2 | Vmax |

POWER CONDITION MANAGEMENT TABLE 132

| COMMAND TYPE | SYSTEM TYPE | OPERATING CONDITION | CONFIGURATION MODULE TYPE AND QUANTITY |
|---|---|---|---|
| NEW SYSTEM CONFIGURATION REQUEST | SERVER 2 (Web SERVER) | LOW | GENERAL-PURPOSE MODULE : 2 |
| SYSTEM OPERATING CONDITION CHANGE REQUEST | SERVER 1 (DB SERVER) | HIGH | GENERAL-PURPOSE MODULE : 2 |

| MODULE IDENTIFIER | 1 | 2 | 3 | ... | N |
|---|---|---|---|---|---|
| SYSTEM IDENTIFIER | 1 | 1 | UNALLOCATED | UNALLOCATED | 2 |

MODULE MANAGEMENT TABLE 136

*FIG. 9*

| LOGICAL SYSTEM NUMBER | 1 | 2 | ~201 |
|---|---|---|---|
| SYSTEM TYPE | SERVER 1 | SERVER 2 | ~202 |
| MODULE IDENTIFIER | 1, 3 | 2, 4 | ~203 |
| POWER SYSTEM | 1 | 2 | ~1303 |

SYSTEM COMPONENT MANAGEMENT TABLE 1230

POWER MANAGEMENT METHOD FOR INFORMATION PLATFORM

CLAIM OF PRIORITY

The present application claims priority from Japanese patent application JP 2006-147772 filed on May 29, 2006, the content of which is hereby incorporated by reference into this application.

BACKGROUND OF THE INVENTION

This invention relates to an information platform for limiting power consumed by a processing module constituting a logical system.

In recent years, for improving investment efficiencies for IT systems in companies, needs for consolidation of information platforms are increasing. Owing to the consolidation, processing systems such as a server system, a router system, and a storage system which have been constituted in different casings up to now are integrated in a single casing.

Specifically, in a case of the server system, a blade server in which a plurality of server systems are mounted to a single casing, for realizing saving of space and reducing complexity of cabling of power supplies, networks, and the like is used. In the blade server, components such as a CPU, a memory, and a hard disk drive (HDD) are mounted in a thin case called a "blade", and a plurality of blades are mounted to a casing called an "enclosure", thereby realizing a denser platform of the server systems.

Also in a case of the storage system or the router system, generally constituent elements of the processing system are modularized and only the necessary elements are connected in terms of performance to the casing, for securing performance and scalability. As described above, the current information platforms have the constituent elements of the processing system modularized.

As a system configuration of integrating those processing systems into one, an integration platform for integrating the plurality of processing systems by a single switch is desirable. In the integration platform, various applications are mounted to one or more logical systems configured in the information platform, to thereby execute tasks.

In a case where the integration platform is configured by the blade server, each processing module is constituted by a blade, and one or a plurality of processing modules are combined to constitute the logical system. The blade server is equipped with a single or a multiplexed power supply and supplies power to each blade. Generally, the power supply module is designed to be capable of supplying maximum power necessary for operating all the blades equipped in the blade server. In a case of executing tasks, a maximum power permissible is supplied according to the configuration of the system.

For example, JP 2004-178598 A discloses a power supplying method in a blade server system. A procedure of inserting a blade and/or an interconnect device into a chassis of a server being supplied with power or being operated is called hot-plugging. In the power supplying method, prior to supplying power to the hot-plugged blade and/or interconnect device, a fabric type of an already installed blade and/or interconnect device is correlated with that of the newly hot-plugged blade and/or interconnect device, and power supply to the hot-plugged blade and/or interconnect device is switched according to a result of the correlation.

Further, JP 2005-202506 A discloses a power management system in which power is managed by an entire blade server without depending on an operating system (OS) or an application. In the power management system, a blade server includes in a casing a plurality of blades, one or more power supply boxes for supplying power to the blades, and a single system management controller connected to a baseboard management controller (BMC). The single system management controller detects a mounting number of the blades, power consumption of each of the blades, and output power from the power supply boxes, and also controls the power consumption of the blades according to a priority of reduction in power consumption of each of the blades, in a case where power consumption of the entire blade server exceeds the maximum output power.

Further, JP 2004-078935 A discloses a method of managing an operation voltage of a blade in a bladed architecture. In a case of operating a first blade at a first voltage level, the first blade serves as a host for an application requiring a first power distribution, and consumes a part of budget (e.g. heat/power) of the bladed architecture system based on the first power distribution. In a case of operating a second blade at a second voltage level, the second blade serves as a host for an application requiring a second power distribution, and consumes a part of budget of the bladed architecture system based on the second power distribution. The entire amount of budget in this case is maintained by adjusting at least one of the first voltage level and the second voltage level.

The logical system described above is employed in various ways depending on the logical system itself and applications thereof. For example, in a case of operating a Web application, a CPU use ratio is low since the Web application does not require such a high-speed operation. On the other hand, in a case of a database server, loads on the CPU becomes high since high-speed computing processing is required, leading to an increase in power consumption. In the conventional technique, maximum power necessary is determined based on a calculation of the power consumption of the information platform as a whole. Therefore, it is impossible to control the power consumption for each logical system.

In addition, in a case of a blade server, even when the blade server has a system in which a plurality of logical systems exist and a system configuration of the logical systems dynamically changes, power systems for each of the logical systems cannot be changed dynamically because a relationship between a position of the blade and the power module is fixed. An example will be given of an information platform including a blade server having four blades 0, 1, 2, and 3, in which a power module 0 supplies power to the blades 0 and 1 and a power module 1 supplies power to the blades 2 and 3. In the information platform of this type, when a logical system 0 is composed of the blades 0 and 2 and a logical system 1 is composed of the blades 1 and 3, either one of the logical systems 1 and 2 is composed of modules having different power systems connected thereto. In this case, when a failure occurs in either one of the power modules 0 and 1, a failure is caused in both the logical systems 0 and 1.

This invention has been made to solve the above-mentioned problems and therefore has an object to provide an information platform which is capable of saving power by limiting power consumed by a processing module constituting a logical system, and which improves fault-tolerant characteristics by setting a power supply system in a unit of the logical system.

SUMMARY OF THE INVENTION

A representative aspect of this invention is as follows. That is, there is provided a power management method for an information platform including: at least one processing module; a management module; a switch coupled to the processing module and the management module; and a power supply module for supplying power to the processing module, the management module, and the switch, wherein the information platform causes at least one logical system constituted by the processing module to operate. The example method comprises: a first step of holding, by the management module, system configuration information indicating a correspondence between the logical system and the at least one processing module constituting the logical system; a second step of holding, by the management module, power management information indicating a correspondence between information with which a type of the logical system can be specified, an operating condition of the logical system, and first power consumption for operating the logical system; a third step of selecting, by the management module, the processing module which constitutes the logical system specified by a configuration request of the logical system by referring to the system configuration information when receiving the configuration request; a fourth step of calculating, by the management module, the first power consumption for operating the logical system based on the type of the logical system and the operating condition of the logical system included in the configuration request, and the power management information; and a fifth step of determining, by the management module, second power consumption to be supplied to the processing module based on the calculated first power consumption and information on each of the processing modules constituting the logical system.

Accordingly, by controlling power in a unit of the logical system and controlling power in a unit of the processing module constituting the logical system, a power-saving effect on the information platform can be achieved by not having to constantly supply power at maximum power consumption to each of the processing modules.

BRIEF DESCRIPTION OF THE DRAWINGS

The present invention can be appreciated by the description which follows in conjunction with the following figures, wherein:

FIG. 2 is an explanatory diagram showing a configuration of a system component management table in accordance with the first embodiment of this invention;

FIG. 3 is an explanatory diagram showing a configuration of a power management table in accordance with the first embodiment of this invention;

FIG. 8 is an explanatory diagram showing a configuration of a system configuration request in accordance with the first embodiment of this invention;

FIG. 9 is an explanatory diagram showing a configuration of a module management table in accordance with the first embodiment of this invention;

DETAILED DESCRIPTION OF THE PREFERRED EMBODIMENTS

Hereinafter, embodiments of this invention will be described with reference to the attached drawings.

First Embodiment

Figure 1:
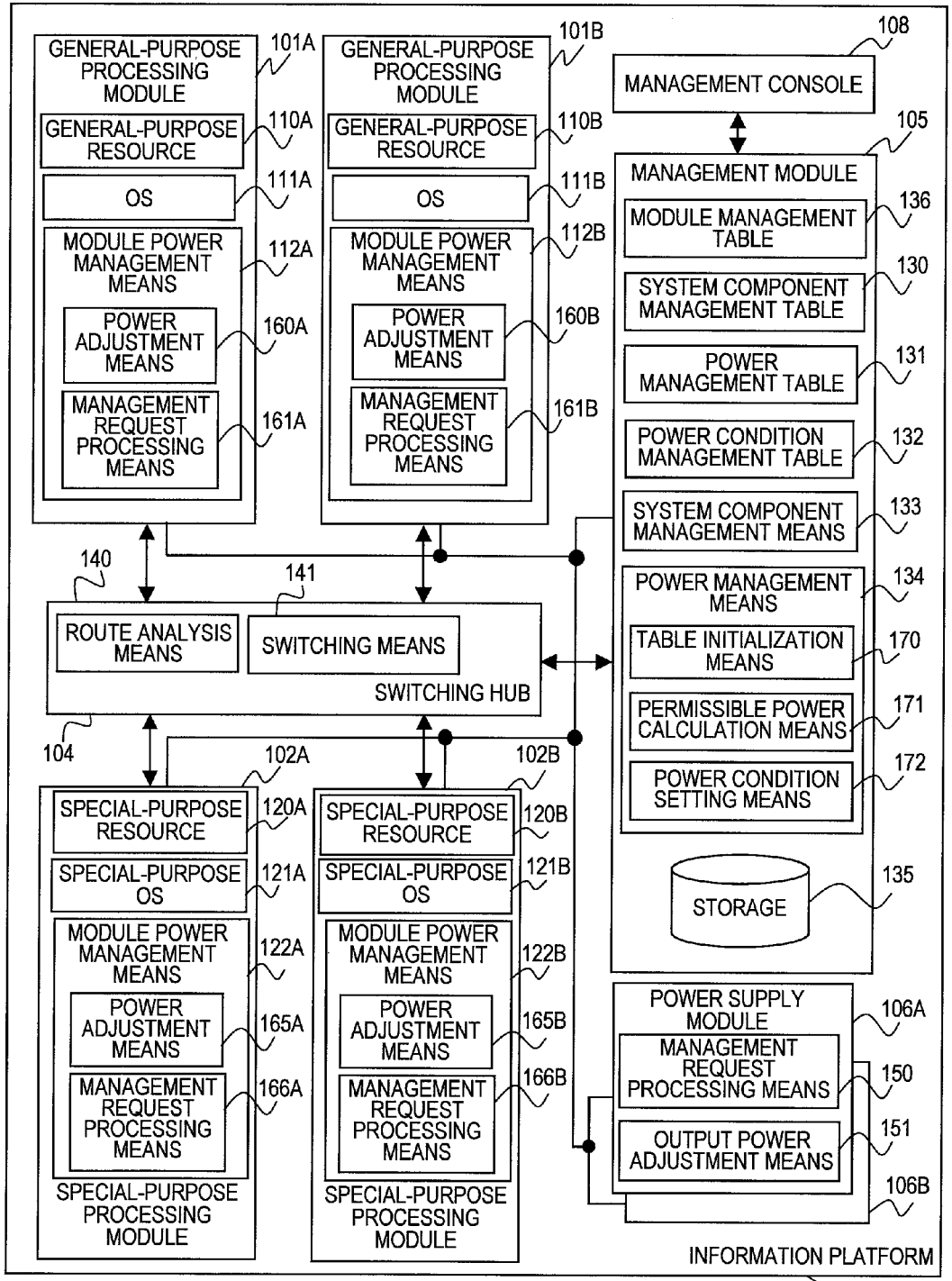
FIG. 1 is a configuration block diagram showing an information platform for realizing a power management system in accordance with a first embodiment of this invention.

FIG. 1 is a configuration block diagram of an information platform for realizing a power management system in accordance with a first embodiment of this invention.

An information platform 109 includes a plurality of processing modules (e.g., general-purpose processing modules and special-purpose processing modules), a switching hub 104, a management module 105, a power supply module 106 (106A and 106B), and a management console 108. The processing modules include general-purpose processing modules 101 (101A and 101B) and special-purpose processing modules 102 (102A and 102B).

The general-purpose processing module 101, the special-purpose processing module 102, and the management module 105 are connected to the switching hub 104. Each of the modules and the switching hub 104 are connected to one another via a common physical interface. In actuality, each of the modules is mounted with an adapter which is an interface for connecting with the switching hub 104, and each of the modules is connected to the switching hub 104 via the adapter.

A common physical interface is used for the connection with the information platform 109. However, for a protocol to which the interface is subordinated, any protocol may be used. For example, the protocol may be a unique protocol having a unique physical interface, or may be a unique protocol having a standard physical interface such as a PCI. Alternatively, the protocol may be a standard protocol having a standard physical interface such as PCI Express or Advanced Switching Interconnect.

In the embodiment of this invention, each of the modules and the switching hub are connected with each other via the physical interface using the PCI Express. It should be noted that in the example embodiment described herein, the modules are connected to a single switching hub 104. However, various other embodiments of the invention may contemplate the modules being connected by a plurality of switching hubs.

Each general-purpose processing module 101 (101A and 101B) exchanges management information and user data with the special-purpose processing module 102 and the management module 105 via the switching hub 104. Further, a general-purpose processing module 101 exchanges information with another general-purpose processing module 101 via the switching hub 104. The general-purpose processing module 101 executes processing of enhancing functionality, such as computing processing of a server system, network processor processing of a router system, and RAID control processing of a storage system. It should be noted that in the example embodiment described herein, two general-purpose processing modules 101 are shown in the figure. However, other example embodiments of the invention contemplate that there may be provided two or more such modules.

Each special-purpose processing module 102 (102A and 102B) exchanges information with the general-purpose processing module 101 and the management module 105 via the switching hub 104. The special-purpose processing module 102 executes processing corresponding to a line card of the router system and the like for connecting to an external network, and processing of accessing a special-purpose device such as a hard disk drive of the storage system. It should be noted that in the example embodiment described herein, two special-purpose processing modules 102 are shown in the figure. However, other example embodiments of the invention contemplate that there may be provided two or more such modules.

The switching hub 104 connects the general-purpose processing module 101, the special-purpose processing module 102, and the management module 105 with one another. It should be noted that the switching hub 104 is composed of a crossbar switch. An inner configuration of the switching hub 104 may be of any configuration as long as information can be exchanged between the special-purpose processing module 102 and the management module 105 such configurations may include a bus, a crossbar network, and a multi-stage network. Further, in the example embodiment described herein, only one switching hub 104 is shown in the figure. However, other example embodiments of the invention may contemplate that there may be provided a plurality of those.

The switching hub 104 includes a route analysis means 140 and a switching means 141. The route analysis means 140 analyzes a header portion of a packet transferred from each of the processing modules and determines to which port of the switching hub 104 the packet is to be transferred. The switching means 141 switches a destination of the packet to a destination port according to a result of analysis of the route analysis means 140.

The management module 105 manages the entire configuration of the information platform 109. It should be noted that in the example embodiment described herein, only one management module 105 is shown in the figure. However, other example embodiments of the invention contemplate that there may be provided a plurality of those for enhancing reliability. In the case of providing the plurality of management modules 105, for consistency therebetween, a structure with which information can be exchanged among the management modules 105 becomes necessary.

Each of the power supply modules 106 (106A and 106B) supplies power to each portion of the information platform 109. A plurality of power supply modules 106, all of which are multiplexed, are provided in the information platform 109. From which of the power supply modules 106A and 106B the power is to be supplied is determined in advance for each of the processing modules (general-purpose processing module 101 and special-purpose processing module 102). Specifically, the power supply module 106 that supplies power to a slot into which each processing module is inserted is determined for each slot.

It should be noted that in the embodiment described herein, two power supply modules 106 are shown in the figure. However, other example embodiments of the invention contemplate that two or more of those may be provided.

The management console 108 is a computer having a CPU, a memory, and the like. The management console 108 transfers a system configuration request from an administrator to the management module 105. The system configuration request includes: a new system configuration request for newly configuring a system of the information platform 109; a system expansion request, a configuration degeneration request, a configuration deletion request, and a system function change request for changing the configuration of the information platform; and a system configuration investigation request for investigating the configuration of the system. The system configuration request will be described in detail later.

Each of the general-purpose processing modules 101 (101A and 101B) includes a general-purpose resource 110 (110A and 110B), an operating system (OS) 111 (111A and 111B), and a module power management means 112 (112A and 112B) respectively. The general-purpose resource 110 includes a CPU and a memory. The OS 111 is software operated in the general-purpose processing module 101.

The module power management means 112 manages power consumed by the general-purpose processing module 101. Each of the module power management means 112 (112A and 112B) includes a power adjustment means 160 (160A and 160B) and a management request processing means 161 (161A and 161B) respectively. The power adjustment means 160 sets maximum permissible power for the general-purpose processing module 101. The management request processing means 161 communicates with the management module 105 and sets the maximum permissible power to be supplied to the general-purpose processing module 101.

The special-purpose processing module 102 (102A and 102B) includes a special-purpose resource 120 (120A and 120B), a special-purpose OS 121 (121A and 121B), and a module power management means 122 (122A and 122B) respectively.

The special-purpose resource 120 is an I/O device such as a disk drive or a line card of a router. The special-purpose OS 121 is a program executed exclusively for I/O processing. The module power management means 122 is similar to the module power management means 112 of the general-purpose processing module 101 described above.

The management module 105 manages each portion of the information platform 109. The management module 105 includes a system component management table 130, a power management table 131, a power condition management table 132, a system component management means 133, a power management means 134, a storage 135, and a module management table 136.

The system component management table 130 manages configuration modules of a logical system configured in the information platform 109. Specifically, the system component management table 130 manages combinations of the general-purpose processing module 101 or the special-purpose processing module 102 which constitute the logical system. Types of the logical system include a server system, a router system, and a storage system.

For example, the server system is composed of the special-purpose processing module 102 for executing access processing to the disk drive, and the plurality of general-purpose processing modules 101. The router system is composed of the special-purpose processing module 102 for executing I/O processing to an external device, such as the line card, and the general-purpose processing module 101 for executing processing for routing. Further, the storage system is composed of the special-purpose processing module 102 for realizing a storage controller that executes access processing to the disk drive, and the general-purpose processing module 101 for executing processing such as RAID control processing.

It should be noted that the management module 105 can manage various systems other than the server system, the router system, and the storage system as described above. The management module 105 may manage any system as long as the system can be constituted by the combinations of the general-purpose processing module 101 and the special-purpose processing module 102. Details of the system component management table 130 will be given later with reference to FIG. 2.

The power management table 131 is information managed by the power management means 134 and is a table for managing operating conditions of a plurality of logical systems configured in the information platform 109 for each type, and permissible power with respect to the logical systems. Details of the power management table 131 will be given later with reference to FIG. 3.

The power condition management table 132 is a table managed by the power management means 134 and holds a correspondence between the permissible power and an operation condition for each of the processing modules. Details of the power management table 132 will be given later with reference to FIG. 4.

The module management table 136 manages a correspondence between an identifier of each processing module and the logical system to which the processing module belongs. Details of the module management table 136 will be given later with reference to FIG. 9.

The system component management means 133 accepts a system configuration management request transmitted from the management console 108 and configures a logical system by combinations of the general-purpose processing module 101 and the special-purpose processing module 102 based on the accepted management request. The system component management means 133 manages the configuration of all the logical systems. The system component management means 133 refers to the system component management table 130 and the module management table 136 and executes the processing.

The power management means 134 includes a table initialization means 170, a permissible power calculation means 171, and a power condition setting means 172. The power management means 134 manages power for each logical system and sets a power condition of the processing module constituting the logical system so that the power condition satisfies the power managed for each logical system.

The power management means 134 refers to the table initialization means 170 to register or delete information with respect to each entry of the power management table 131 and the power condition management table 132. Details of the table initialization means 170 will be given later with reference to FIG. 5.

The permissible power calculation means 171 calculates permissible power of the logical system. Details of the permissible power calculation means 171 will be given later with reference to FIG. 6.

The power condition setting means 172 sets the power condition calculated by the permissible power calculation means 171 to each processing module constituting the logical system.

The storage 135 is a non-volatile storage device constituted by, for example, one or more hard disk drives. The storage 135 saves initial values of various tables stored in the management module 105 and periodically stores the various tables.

The storage 135 holds the various tables managed by the system component management means 133 and the power management means 134. Those tables include the module management table 136, the system component management table 130, the power management table 131, and the power condition management table 132.

It should be noted that those tables are stored in a memory area in the management module 105, and contents of those tables are updated by the processing of the management module 105. In addition, the management module 105 periodically stores those various tables in the storage 135. Thus, the various tables are held in the storage 135 even when power supply to the management module 105 is stopped.

Each of the power supply module 106 (106A and 106B) includes a management request processing means 150 and an output power adjustment means 151. The management request processing means 150 receives information on power set by the management module 105 and instructs the output power adjustment means 151 to adjust the output power. The output power adjustment means 151 determines the permissible power to be supplied according to the instruction and supplies the determined power to each portion of the information platform 109.

FIG. 2 is an explanatory diagram showing an example of the system component management table 130 stored in the management module 105 in accordance with the first embodiment of this invention.

The system component management table 130 manages the configuration of the logical system configured in the information platform 109. The system component management table 130 is managed by the system component management means 133 of the management module 105. Specifically, the system component management table 130 stores information of the logical system constituted by the general-purpose processing module 101 and the special-purpose processing module 102.

The system component management table 130 is composed of entries including a logical system number field 201, a system type field 202, and a module identifier field 203.

The system number field 201 stores an identifier of the logical system constituted by the processing module. The identifier is a value unique in the information platform. The system type field 202 stores an identifier indicating a type of the logical system.

Specifically, FIG. 2 shows two kinds of server systems of a "server 1" and a "server 2". For example, the server 1 is for a Web server application and the server 2 is for a DB server application. In the example embodiment described herein, only two system types are shown. However, other example embodiments of the invention contemplate that server applications such as a router system application or a storage system application may be set as the system types. Further, even in the case of the server system, two or more kinds of the system type may be set.

The module identifier field 203 stores an identifier of the processing module constituting the logical system. For example, in the embodiment of this invention, the logical system #1 is composed of a module #1 and a module #3 and a logical system #2 is composed of a module #2 and a module #4.

FIG. 3 is an explanatory diagram showing an example of the power management table 131 stored in the management module 105 in accordance with the first embodiment of this invention.

The power management table 131 is managed by the power management means 134 and stores permissible power for each system type. The power management table 131 is created prior to configuration of the logical system.

The power management table 131 is composed of entries including a system type field 301, an operating condition field 302, and a permissible power field 303.

The system type field 301 stores a type of the logical system. Since the system type is the same as the system type field 202 of FIG. 2, detailed description thereof will be omitted.

The operating condition field 302 stores a broad operating condition of the system type of the logical system when the logical system is operated. The operating condition of the logical system is set by an administrator via the management console 108, and indicates a power level or a performance level permissible for the logical system.

For example, in a case of managing the power level, "HIGH" is stored when the power necessary for the logical system is relatively large, and "LOW" is stored when the necessary power is relatively low. Further, in a case of managing the performance level, "HIGH" is stored when performance necessary for the logical system is high, and "LOW" is stored when necessary performance is low. The operating condition may be any condition as long as it is information readily understood by the administrator in managing the system.

The permissible power field 303 stores a specific power value permissible for the logical system with respect to the operating condition. For example, in the embodiment of this invention, "A" is set for the permissible power with respect to the operating condition "HIGH" and "B" is set for the permissible power with respect to the operating condition "LOW".

Figures 4, 5:
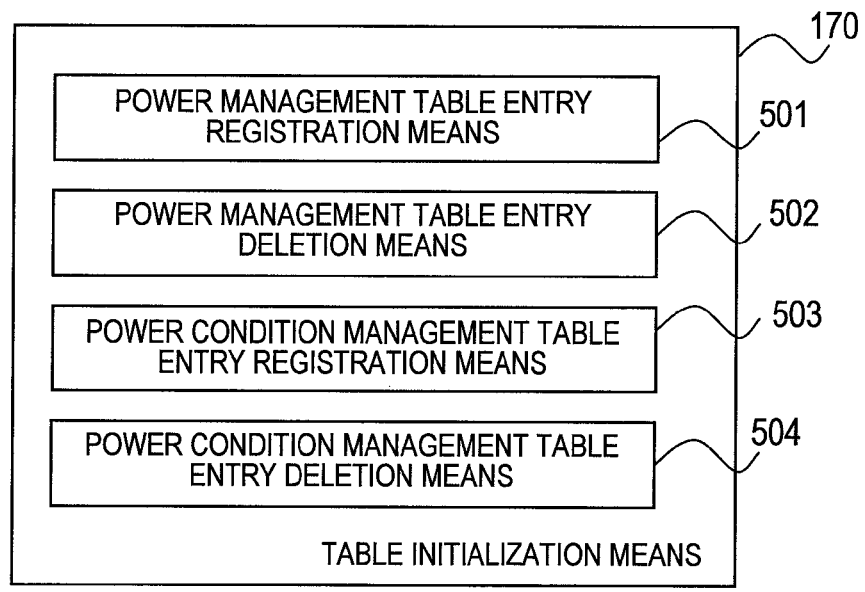
FIG. 4 is an explanatory diagram showing a configuration of a power condition management table in accordance with the first embodiment of this invention.
FIG. 5 is a block diagram showing a table initialization means in accordance with the first embodiment of this invention.

FIG. 4 is an explanatory diagram showing an example of the power condition management table 132 stored in the management module 105 in accordance with the first embodiment of this invention.

The power condition management table 132 is composed of entries including a permissible power for module field 401, a processor operation frequency field 402, a memory operation frequency field 403, and an operation voltage field 404.

The power condition management table 132 is set prior to the configuration of the logical system. The power condition management table 132 is set according to the processing module type. For example, the power condition management table 132 is set for both of the general-purpose processing module 101 and the special-purpose processing module 102. It should be noted that only one power condition management table 132 may be provided if the table includes information indicating the processing module type.

The permissible power for module field 401 indicates power permissible to the processing module (permissible power). The processor operation frequency field 402, the memory operation frequency field 403, and the operation voltage field 404 hold operation conditions for realizing the permissible power. In other words, the processor operation frequency field 402 stores an operation frequency of a processor of the processing module for realizing the permissible power. The memory operation frequency field 403 stores an operation frequency of a memory of the processing module. The operation voltage field 404 stores an operation voltage of the processing module.

Specifically, in the example of FIG. 4, the operation condition in realizing a permissible power X1 is as follows: P1 for the processor operation frequency, M1 for the memory operation frequency, and V1 for the operation voltage. Further, Xmax indicates a maximum permissible power of the processing module. When the permissible power is at its maximum, the operation condition is follows: Pmax for the processor operation frequency, Mmax for the memory operation frequency, and Vmax for the operation voltage.

It should be noted that in the example embodiment described herein, the permissible power per processing module is determined based on three operation conditions including the processor operation frequency, the memory operation frequency, and the operation voltage. However, other example embodiments of the invention contemplate that the permissible power may be determined based on other operation conditions in addition to those described above. Further, three values of X1, X2, and Xmax are set for the permissible power in FIG. 4. However, three or more values may be set.

FIG. 5 is a further detailed block diagram of the table initialization means 170 included in the power management means 134 of the management module 105 in accordance with the first embodiment of this invention.

The table initialization means 170 includes a power management table entry registration means 501, a power management table entry deletion means 502, a power condition management table entry registration means 503, and a power condition management table entry deletion means 504.

The power management table entry registration means 501 newly registers an entry to the power management table 131 and updates contents of entries held in the power management table 131. The power management table entry deletion means 502 deletes an entry already registered in the power management table 131. The power condition management table entry registration means 503 newly registers an entry to the power condition management table 132 and updates entries held in the power condition management table 132. The power condition management table entry deletion means 504 deletes an entry already registered in the power condition management table 132.

Figure 6:
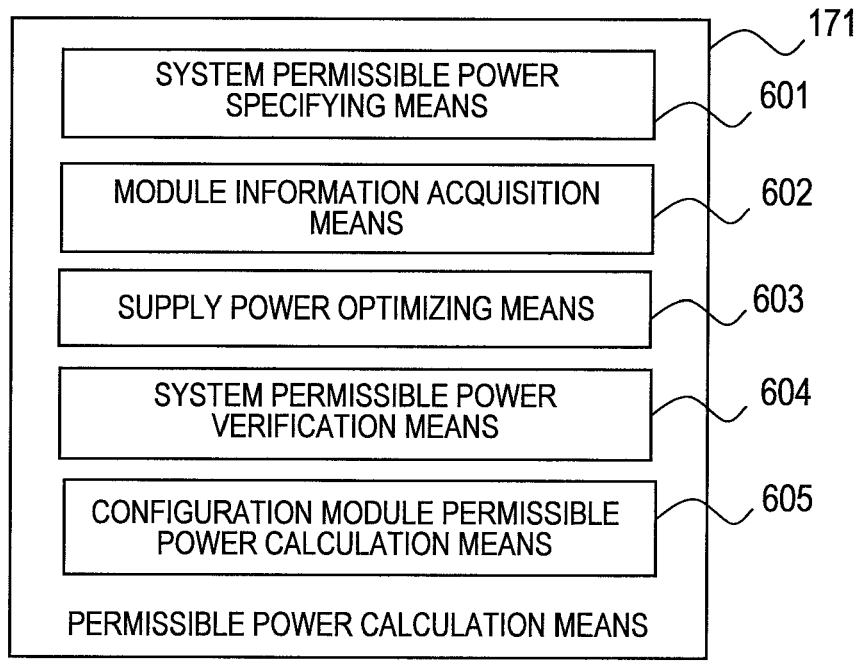
FIG. 6 is a block diagram showing a permissible power calculation means in accordance with the first embodiment of this invention.

FIG. 6 is a further detailed block diagram of the permissible power calculation means 171 included in the power management means 134 of the management module 105 in accordance with the first embodiment of this invention. The permissible power calculation means 171 includes a system permissible power specifying means 601, a module information acquisition means 602, a supply power optimizing means 603, a system permissible power verification means 604, and a configuration module permissible power calculation means 605.

The system permissible power specifying means 601 specifies, when the administrator newly configures a logical system, permissible power of the logical system to be newly configured based on the system type and the operating condition designated as parameters of the system configuration request. The module information acquisition means 602 acquires information from each processing module or the power supply module included in the information platform 109.

When the administrator has set a mode for optimizing supply power in the system configuration request, the administrator has issued a supply power optimizing request, or the administrator has made a setting in advance to optimize the supply power in the system, the supply power optimizing means 603 optimizes the supply power so that the supply power is balanced with a total amount of permissible power of the logical system configured in the information platform. Accordingly, the supply power can be reduced when the supply power is larger than the permissible power.

The system permissible power verification means 604 compares the permissible power of the logical system specified by the system permissible power specifying means 601 with the maximum power of each module constituting the logical system, which has been acquired by the module information acquisition means 602.

The configuration module permissible power calculation means 605 calculates the permissible power of the processing module using the power condition management table 132 when the permissible power of the new logical system is smaller than the total of the maximum power of the configuration modules.

Figure 7:
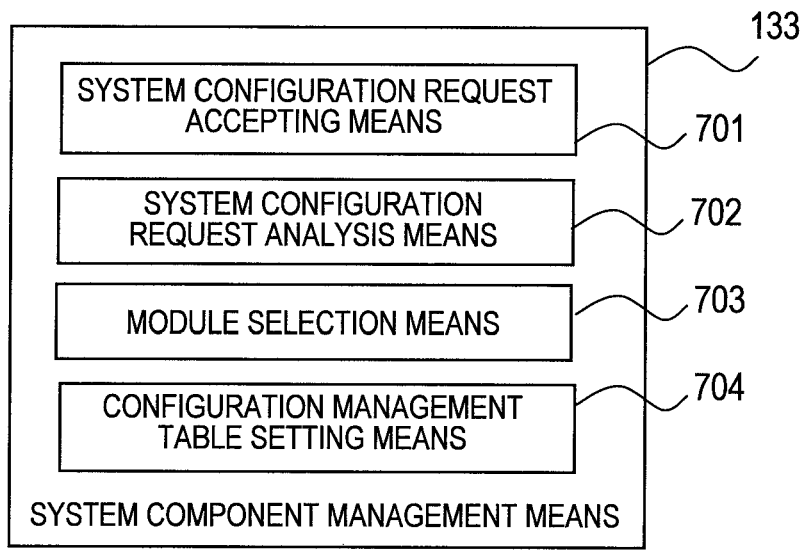
FIG. 7 is a block diagram showing a system component management means in accordance with the first embodiment of this invention.

FIG. 7 is a further detailed block diagram of the system component management means 133 of the management module 105 in accordance with the first embodiment of this invention.

The system component management means 133 includes a system configuration request accepting means 701, a system configuration request analysis means 702, a module selection means 703, and a configuration management table setting means 704.

The system configuration request accepting means 701 accepts a system configuration request input by the administrator via the management console 108. The system configuration request analysis means 702 analyzes a content of the accepted system configuration request. The module selection means 703 refers to the module management table 136 and selects a module for constituting a logical system according to the input system configuration request. It should be noted that details of the module management table 136 will be given later with reference to FIG. 9. The configuration management table setting means 704 newly adds an entry or updates settings with respect to the system component management table 130 and the module management table 136.

FIG. 8 is an explanatory diagram showing an example of a configuration of the system configuration request input from the management console 108 in accordance with the first embodiment of this invention.

The system configuration request is input to the management console 108 by the administrator or the like, and is received by the system component management means 133 of the management module 105.

The system configuration request includes as parameters of the request a command type field 1001, a system type field 1002, an operating condition field 1003, and a configuration module type and quantity field 1004. In the example embodiment described herein, three kinds of parameters are shown. However, other example embodiments of the invention contemplate that three or more parameters may be provided. For example, the mode for optimizing the supply power as described above may be designated as the parameter.

The command type field 1001 stores a command type of the system configuration request. It should be noted that in the example embodiment described herein, two command types including a new system configuration request and a system operating condition change request are shown. However, other example embodiments of the invention contemplate that the command type field 1001 may support other management requests than those described above.

The system type field 1002 stores a system type. For example, the "server 2" of the system type indicates a Web server and the "server 1" of the system type indicates a DB server.

The operating condition field 1003 stores an operating condition of the logical system. The performance level is used herein as the operating condition. Because the server 2 does not require much of the computing processing, "LOW" is set as the performance level. Because the server 1 requires the computing processing, "HIGH" is set as the performance level. It should be noted that as described above, the operating condition may be managed based on two or more levels.

The configuration module type and quantity field 1004 stores a type and a quantity of the processing module constituting the logical system.

An example of the system configuration request shown in FIG. 8 will be specifically explained.

An entry in the upper row indicates a new system configuration request, that is, a configuration request for a new logical system. As can be seen, the system type of the logical system is "server 2" and the operating condition thereof is "LOW". Further, it shows that the logical system is constituted by two general-purpose processing modules 101.

Similarly, an entry in the lower row indicates a system operating condition change request, that is, a request to change the operating condition of the logical system already set. As can be seen, the system type of the logical system is "server 1" and the operating condition thereof is "HIGH". Further, it shows that the logical system is constituted by two general-purpose processing modules 101.

FIG. 9 is an explanatory diagram of the module management table 136 in accordance with the first embodiment of this invention.

The module management table 136 is managed by the system component management means 133 and manages a correspondence between the logical system and each processing module constituting the logical system. It should be noted that the module management table 136 may be set according to the type of the module or the correspondence may be managed in a single table. Any management method may be employed as long as the correspondence between each module and the logical system can be managed.

The module management table 136 includes a module identifier field 1601 and a system identifier field 1602. The module identifier field 1601 stores an identifier of the processing module. The system identifier field 1602 stores an identifier of the logical system. The example of FIG. 9 indicates that the modules 1 and 2 are allocated to the logical system 1 and that the module corresponding to the module identifier 3 is not allocated to any logical system.

The system component management means 133 and the power management means 134 refer to the module management table 136 to grasp which logical system is constituted by which processing module, or which processing module constitutes which logical system.

Next, an operation of the information platform 109 configured as described above will be explained.

Figure 10:
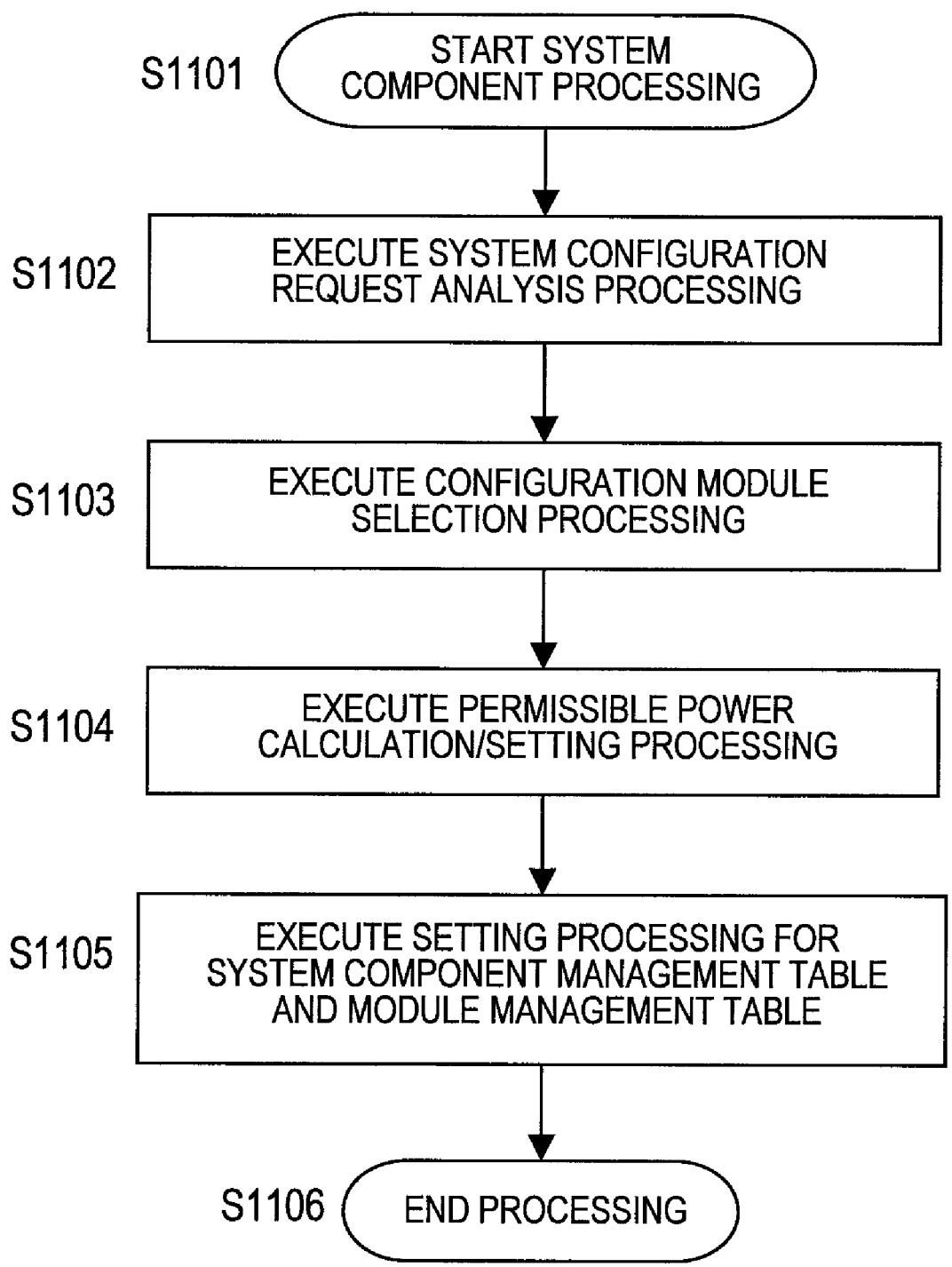
FIG. 10 is a flowchart showing processing of a management module in accordance with the first embodiment of this invention.

FIG. 10 is a flowchart of processing of the management module 105 in accordance with the first embodiment of this invention.

The flowchart of FIG. 10 shows a processing flow of when the management module 105 has received a system configuration request from the administrator via the management console 108.

It should be noted that in the information platform 109, no logical system is configured yet and supply of power from the power supply module 106 to each of the processing modules is not yet started. At this time, least necessary power for processing a request is supplied to the switching hub 104, the management module 105, and the management console 108. In addition, power necessary for communicating with the management module 105, storing setting information, and the like is supplied to each processing module from a network via a power supply path or the switching hub 104. This can be realized by a system equivalent to the standard such as PCI. Thus, description thereof will be omitted.

The processing is started when a system configuration request is instructed to the management console 108 by the administrator or the like (S1101).

First, in the management module 105, upon reception of the system configuration request input to the management console 108 by the system component management means 133, system configuration request analysis processing for analyzing contents thereof is executed (S1102). Specifically, upon reception of the system configuration request, the system configuration request accepting means 701 transmits the received system configuration request to the system configuration request analysis means 702. The system configuration request analysis means 702 analyzes the content of the received system configuration request. The system configuration request analysis means 702 extracts information on the logical system and information on the operating condition and the processing module included in the system configuration request and transmits the extracted information to the module selection means 703.

Subsequently, the module selection means 703 executes configuration module selection processing to select the processing module for constituting the logical system based on the information received from the system configuration request analysis means 702 (S1103). Specifically, the module selection means 703 refers to the module management table 136 and acquires information on the processing module not yet allocated to the logical system. Then, the module selection means 703 selects the processing module which constitutes the logical system based on the information on the processing module received from the system configuration request accepting means 701 and the acquired information on the processing module. After that, the module selection means 703 transmits the selected information to the power management means 134.

Next, the power management means 134 executes permissible power calculation processing for calculating the permissible power of each of the processing modules and the permissible power of the whole information platform based on the received information (S1104). The processing will be described in detail with reference to FIGS. 11 and 12.

Next, the management module 105 executes table setting processing for setting calculated pieces of information in various tables (S1105). Upon completion of the processing, supply of power to each processing module in the information platform 109 is started based on the set pieces of information. Thus, the information platform 109 starts the processing of the set logical system.

Upon completion of the above-mentioned processing, the processing of the flowchart is ended (S1106).

Figure 11:
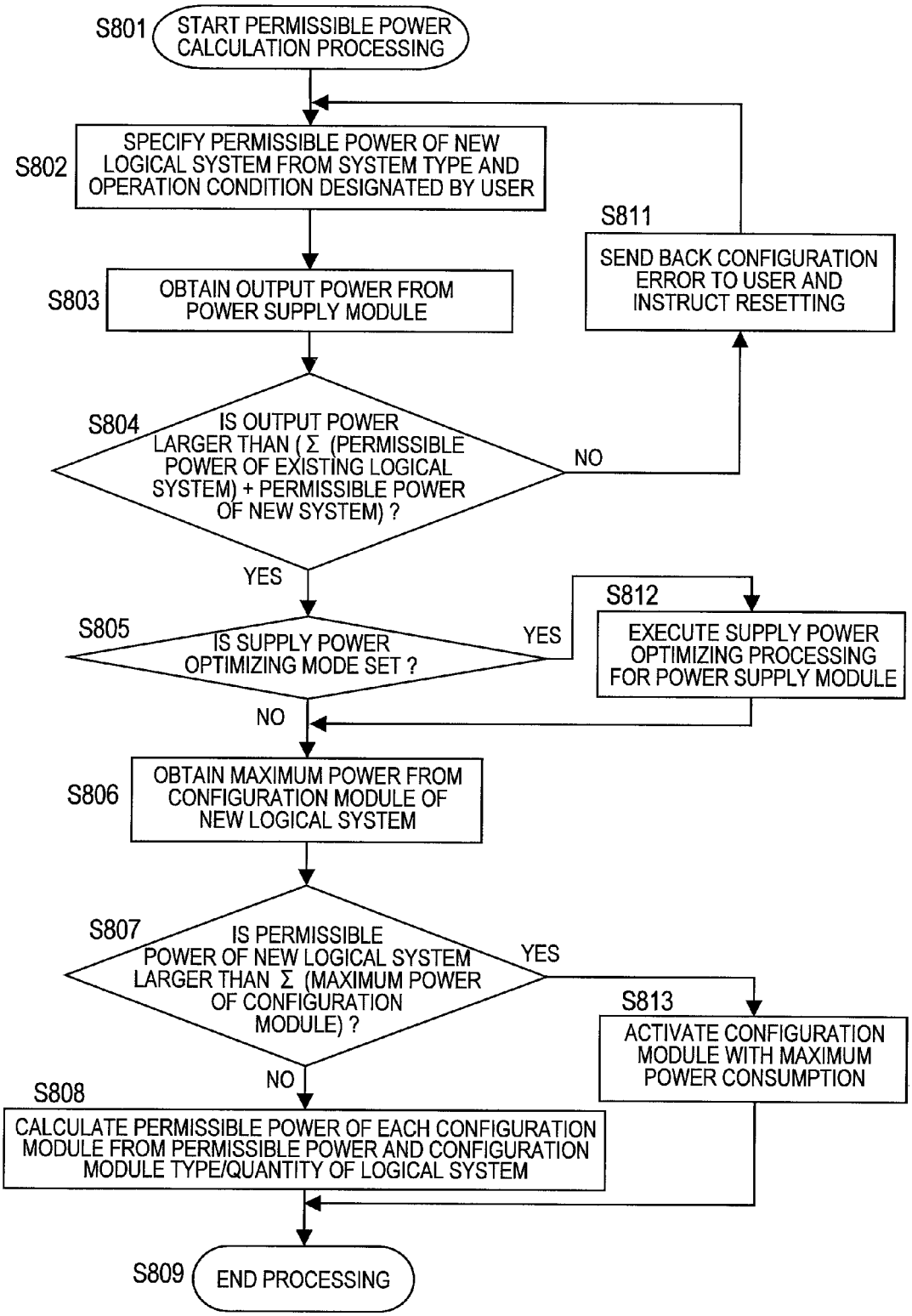
FIG. 11 is a flowchart showing processing of the permissible power calculation means in accordance with the first embodiment of this invention.

FIG. 11 is a flowchart of processing of the permissible power calculation means 171 in the power management means 134 of the management module 105 in accordance with the first embodiment of this invention.

Upon reception of the information on each processing module and the information on the system type, operating condition, and the like of the logical system from the system component management means 133, the permissible power calculation means 171 starts the processing (S801).

First, the permissible power calculation means 171 refers to the power management table 131 and specifies permissible power of a logical system to be newly created, based on the information on the system type and the operating condition included in the system configuration request (S802).

Next, the permissible power calculation means 171 makes an inquiry to the power supply module 106 and acquires output power of the power supply module 106 (S803). It should be noted that the output power of the power supply module 106 is equivalent to the maximum power that can be supplied therefrom.

Next, the permissible power calculation means 171 investigates an existing logical system already set by using the system component management table 130, and investigates the permissible power of the existing logical system by referring to the power management table 131. Then, the permissible power calculation means 171 calculates a value by adding permissible power of the logical system to be newly set to the total permissible power of the existing logical systems. After that, the permissible power calculation means 171 judges whether the calculated value is smaller than the output power acquired from the power supply module 106 (S804).

When the calculated value is determined to be equal to or larger than the acquired output power, the permissible power exceeds maximum output power of the power supply module 106 with the operating condition of the logical system required. Accordingly, a logical system cannot be newly configured. Thus, when the calculated value is determined to be equal to or larger than the acquired output power of the power supply module, the permissible power calculation means 171 notifies an error to the management console 108 and instructs resetting of the operating condition of the logical system (S811).

On the other hand, when the calculated value is determined to be smaller than the acquired output power, the permissible power calculation means 171 judges whether a supply power optimizing mode is set (S805).

The supply power optimizing mode is set by the administrator or the system prior to the configuration request processing. When the supply power optimizing mode is designated, the permissible power calculation means 171 executes supply power optimizing processing of the power supply module (S812).

Specifically, when the calculated value is determined to be smaller than the acquired supply power, the permissible power calculation means 171 adjusts the supply power of the power supply module so that the total permissible power of all the logical systems becomes substantially equal to the permissible power to be supplied from the power supply module 106. Accordingly, the power to be supplied to the information platform as a whole can be suppressed to a least necessary amount while supplying necessary power to each of the processing modules, thus making it possible to save power in the information platform.

When the supply power optimizing mode is not designated and after the supply power optimizing processing of the power supply module is carried out, the permissible power calculation means 171 acquires the maximum power of each processing module based on the information on the processing modules received from the system component management means 133. Specifically, the permissible power calculation means 171 makes an inquiry to each processing module on the maximum power and acquires the maximum power of each processing module. It should be noted that the maximum power of the processing module is equivalent to the maximum power consumption of the processing module. Thus, the maximum power of each of the processing modules constituting the newly configured logical system is acquired (S806).

It should be noted that at this time, the processing module may transmit not only maximum power but also attribute information including a processing module type (e.g., switch, memory module, or distinction between the general-purpose module and the special-purpose module) of the own module and power condition parameters, in response to the inquiry made by the permissible power calculation means 171.

The permissible power calculation means 171 calculates a value by summing up the acquired maximum power of the processing modules to judge whether the calculated value is smaller than the permissible power of the new logical system calculated in Step S802 (S807).

When the calculated value is determined to be smaller than the permissible power of the logical system, it is possible to operate all the processing modules with the maximum power. Thus, the permissible power calculation means 171 determines to activate each processing module with the maximum power (S813).

On the other hand, when the calculated value is determined to be equal to or larger than the permissible power of the logical system, the permissible power calculation means 171 calculates the permissible power of each processing module based on the permissible power of the logical system and the information on the processing module constituting the logical system (S808). At this time, the power management table 131 and the power condition management table 132 are referred to. After that, the processing of this flowchart is ended (S809) and the processing proceeds to power condition setting processing of a flowchart shown in FIG. 12.

Figure 12:
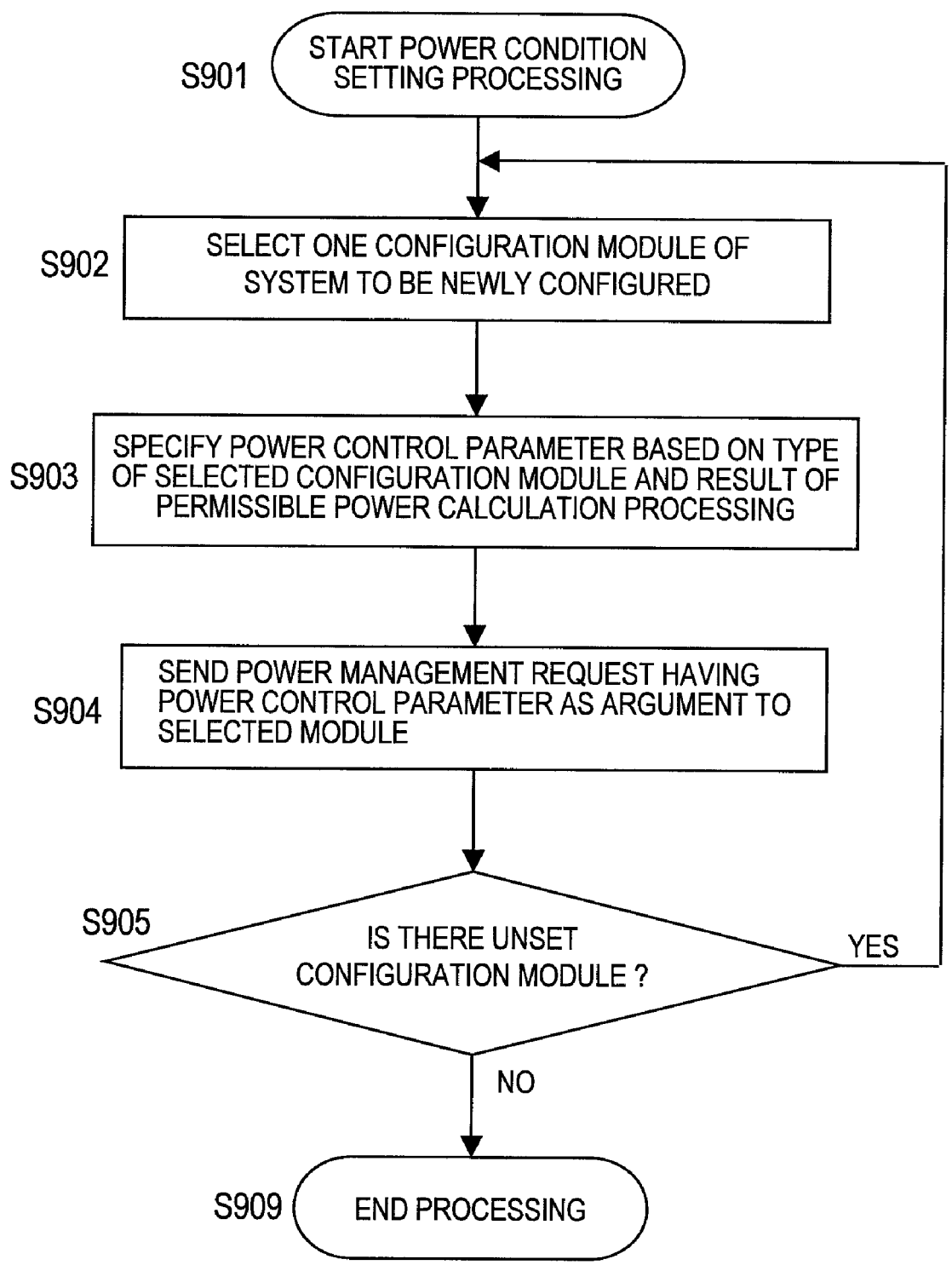
FIG. 12 is a flowchart showing processing of a power condition setting processing of a power condition setting means in accordance with the first embodiment of this invention.

FIG. 12 is a flowchart of the power condition setting processing of the power condition setting means 172 in the power management means 134 of the management module 105 in accordance with the first embodiment of this invention.

First, after starting power condition setting processing (S901), the power condition setting means 172 selects one of the processing modules to constitute the logical system to be newly set (S902).

Next, the power condition setting means 172 calculates the power control parameter based on the selected processing module type and the permissible power calculation result of FIG. 11 described above (S903).

Subsequently, the power condition setting means 172 transmits the specified power control parameter to the processing module selected in Step S902 (S904).

Next, the power condition setting means 172 judges whether there is a processing module whose power control parameter is not set (S905). When there is an unset processing module, the processing returns to Step S902 and the processing is repeated. When there is no unset processing module, processing of all processing modules that constitute the newly set logical system has been completed (S909). Thus, the processing is ended to return to the flowchart of FIG. 10.

As described above, in the power management system according to the first embodiment of this invention, it is possible to limit power consumed by each of the processing modules that constitute the logical system based on the system type and the operating condition of the logical system set in the information platform 109. Accordingly, power can be saved in the information platform 109.

Second Embodiment

Next, description will be given of a power management system according to a second embodiment of this invention.

In the second embodiment, in addition to the first embodiment described above, systems for the power supply module 106 are set for each processing module, thereby improving fault-tolerant characteristics of the logical system. It should be noted that components same as those in the first embodiment are denoted by the same reference symbols and descriptions thereof will be omitted.

Figure 13:
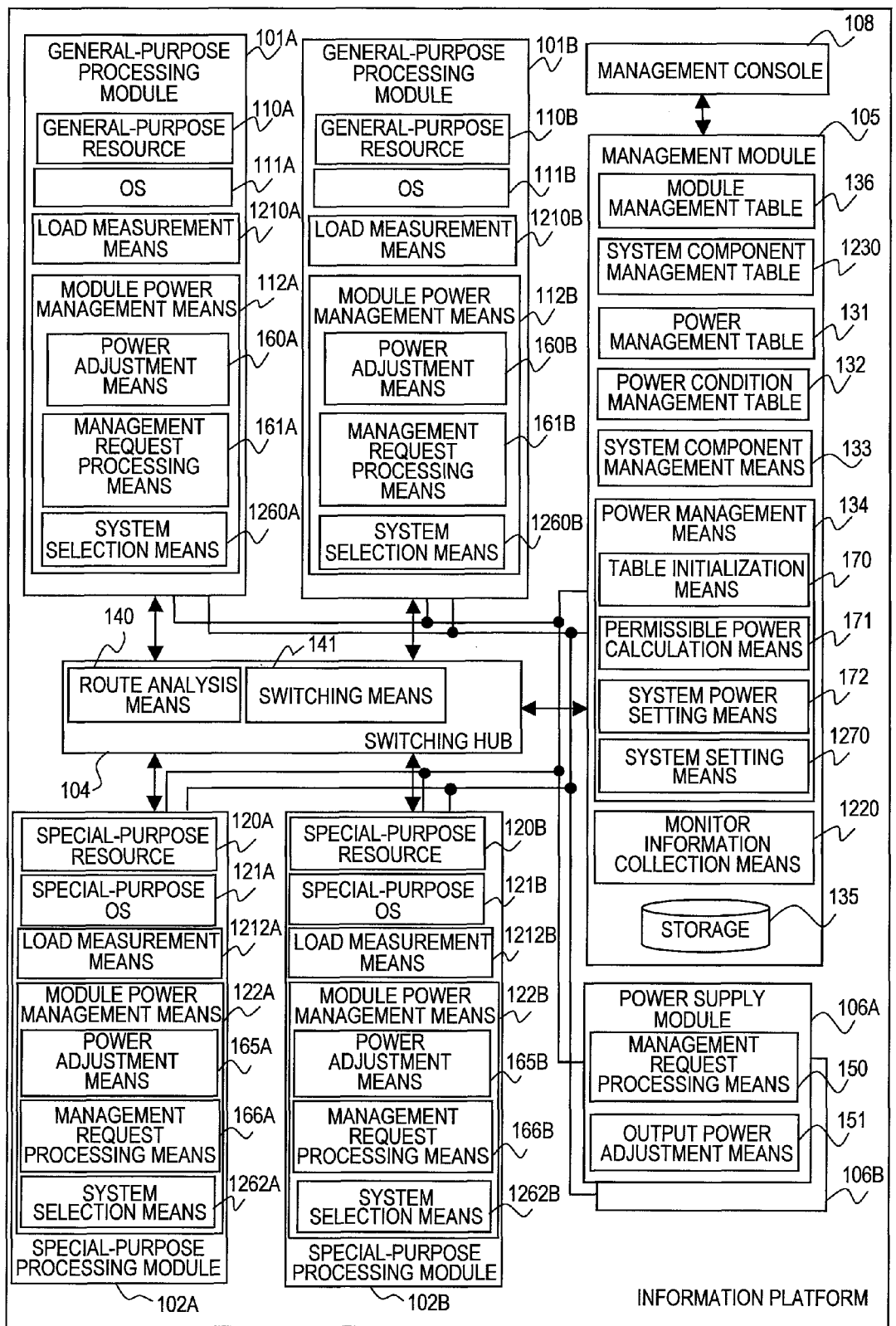
FIG. 13 is a block diagram showing an information platform in accordance with a second embodiment of this invention.

FIG. 13 is a configuration block diagram of the information platform 109 in accordance with the second embodiment of this invention.

The configuration of the information platform 109 according to the second embodiment is the same as that of the first embodiment except for the following points.

That is, each of the processing modules include a load measurement means 1210 or 1212. Further, each of the module power management means includes a system selection means 1260 or 1262. Specifically, each of the general-purpose processing module 101 (101A and 101B) includes the load measurement means 1210 (1210A and 1210B) respectively. Further, each of the module power management means 112 (112A and 112B) includes the system selection means 1260 (1260A and 1260B) respectively. Similarly, the special-purpose processing module 102 (102A and 102B) includes the load measurement means 1212 (1212A and 1212B) respectively. Further, the module power management means 122 (122A and 122B) includes the system selection means 1262 (1262A and 1262B) respectively.

The management module 105 includes a monitor information collection means 1220. In addition, the power management means 134 includes a system setting means 1270.

The load measurement means 1210 measures load data of the general-purpose processing module 101 and transmits the measured load data to the management module 105. Specifically, the load measurement means 1210 measures load data including a load of the CPU of each general-purpose processing module 101 due to the operation of the logical system constituted by the general-purpose processing modules 101, a memory use ratio, or the like, and transmits the measured load data at a predetermined time, with predetermined intervals, or based on a load data transmission request.

Further, the power supply module 106 includes two modules (106A and 106B). The power supply modules 106A and 106B are each equipped with an independent path for supplying power to each processing module and the management module 105. The paths are configured to be capable of being selected on the processing module side. In other words, one processing module can receive power supply from either one of the two power supply modules 106A and 106B.

It should be noted that hereinafter, which of the power supply modules 106A and 1068 power is to be supplied from is referred to as "systematizing". In other words, the processing module whose power supply system is set to 1 receives power supply from the power supply module 106A. Similarly, the processing module whose power supply system is set to 2 receives power supply from the power supply module 106B.

The monitor information collection means 1220 collects pieces of load data from each of the processing modules.

The system setting means 1270 sets systems for each of the processing modules.

Figures 14, 15:
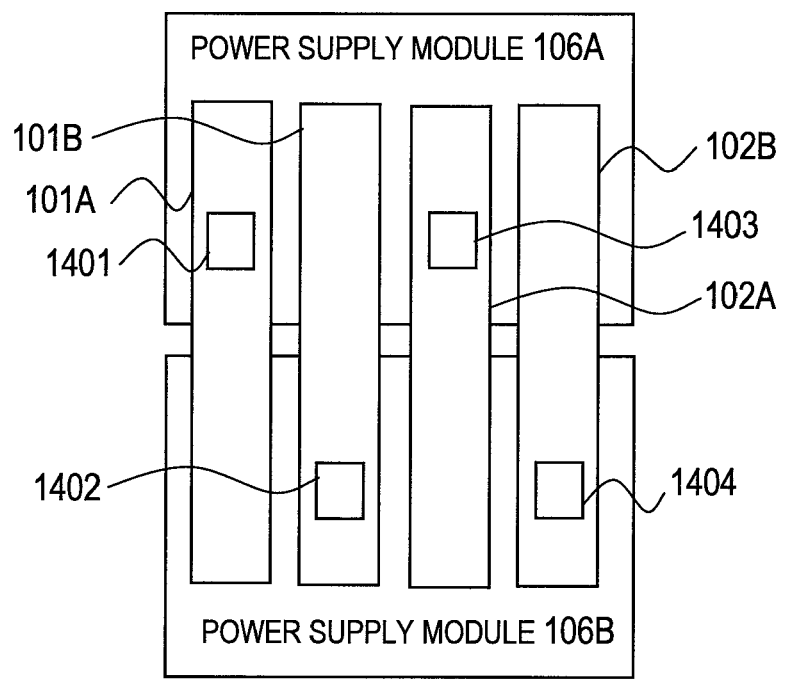
FIG. 14 is an explanatory diagram showing a system component management table in accordance with the second embodiment of this invention.
FIG. 15 is an explanatory diagram showing a connection of power supply modules and processing modules in accordance with the second embodiment of this invention.

FIG. 14 is an explanatory diagram showing an example of a system component management table 1230 in accordance with the second embodiment of this invention.

The system component management table 1230 is similar to the system component management table 130 of the first embodiment described above except that the system component management table 1230 includes a power system field 1303. The power system field 1303 stores an identifier of the power system for each logical system.

The system component management means 133 adds or updates an entry of the system component management table 1230 based on a system configuration request received from the management console 108.

FIG. 15 is an explanatory diagram showing a system setting of the power supply module 106 in accordance with the second embodiment of this invention.

As described above, in this embodiment, power supplies for the logical system and the processing modules constituting the logical system are categorized based on the systems. FIG. 15 is a diagram for showing those systems.

In FIG. 15, there are provided markers (1401, 1402, 1403, and 1404) for indicating which of the power supply modules 106A and 106B is to supply power to the general-purpose processing modules 101A and 101B and the special-purpose processing modules 102A and 102B. For example, the general-purpose processing module 101A has the marker 1401 set on the power supply module 106A side. Thus, the general-purpose processing module 101A is set to receive power supply from the power supply module 106A. Similarly, the special-purpose processing module 102B has the marker 1404 set on the power supply module 106B side. Thus, the special-purpose processing module 102B is set to receive power supply from the power supply module 106B.

The settings of the systems may be displayed on a display screen of the management console 108 so that an administrator performs the setting using a GUI.

Next, description will be given of an operation of the information platform 109 of the second embodiment configured as described above.

As described above, each processing module includes the load measurement means 1210 or 1212. The load measurement means 1210 and 1212 constantly measure a load of the processing modules and transmit measurement results to the monitor information collection means 1220 of the management module 105.

The monitor information collection means 1220 receives the load information transmitted from each processing module. Then, the monitor information collection means 1220 refers to the module management table 136 and calculates the load of each logical system based on information of the processing module that has transmitted the load information. The monitor information collection means 1220 causes the management console 108 to display the load information of each logical system. By viewing the display, the administrator can check the load information of each logical system. Further, when the administrator finds a logical system having a load higher than necessary, the administrator can make a request to optimize the load regarding the logical system.

Specifically, when the administrator transmits a request to optimize the load via the management console 108, the management module 105 changes the setting so as to enhance performance of the processing module constituting the logical system concerned in the request. In other words, the management module 105 specifies the processing module constituting the logical system. Then, the management module 105 refers to the power control parameters currently set in the specified processing module, and the power condition management table 132. Then, the management module 105 resets the power control parameters of the processing module to a higher processor operation frequency, memory operation frequency, and operation voltage for each processing module, and transmits the reset power control parameters to the processing modules.

By performing the setting as described above, when a load of the logical system is high, the setting can be made to reduce the load by changing the performance of the logical system.

Figure 16:
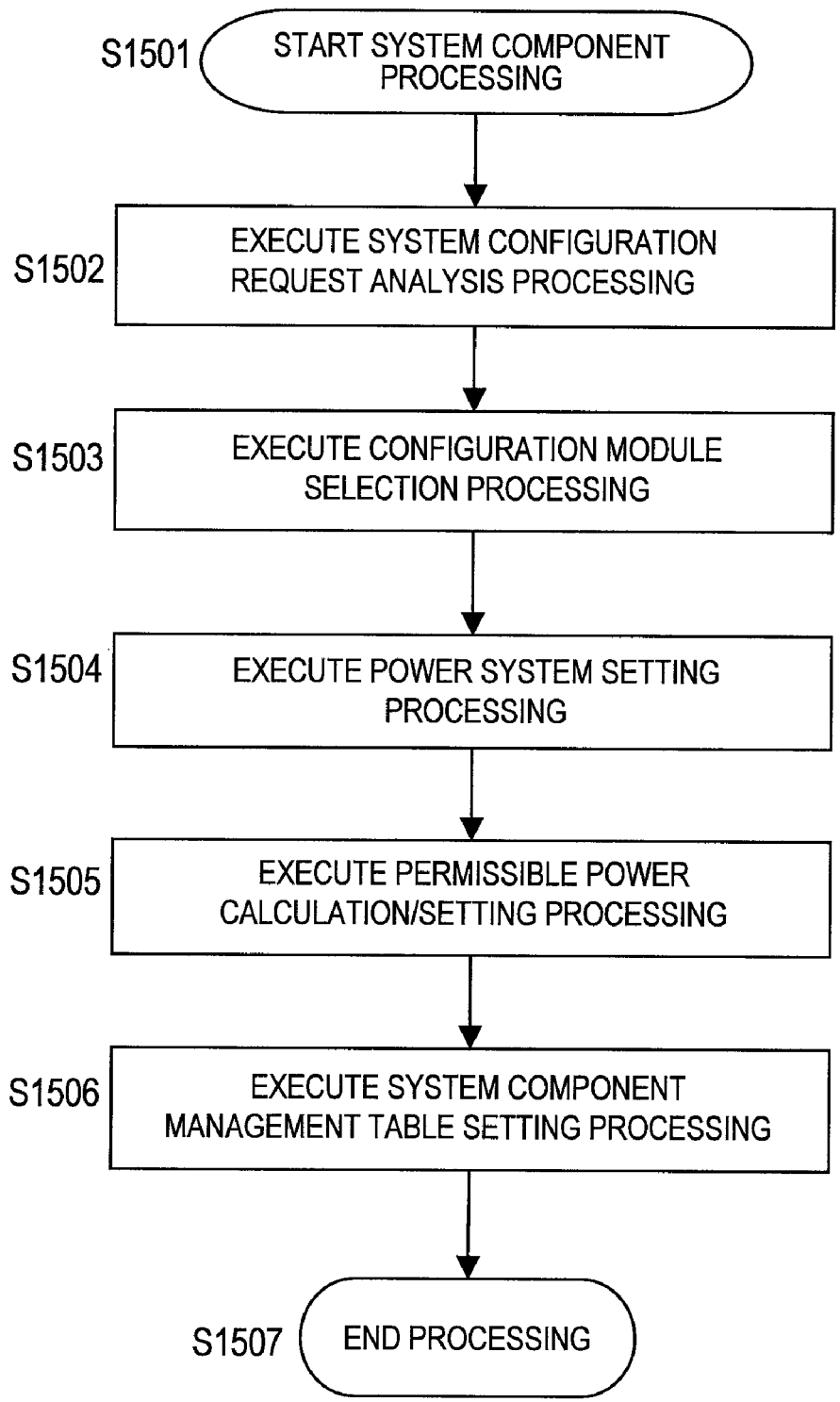
FIG. 16 is a flowchart showing processing of a management module in accordance with the second embodiment of this invention.

FIG. 16 is a flowchart of processing of the management module 105 in accordance with the second embodiment of this invention.

Similar to FIG. 9 described above, the flowchart of FIG. 16 shows processing carried out when the management module 105 receives a system configuration request made by the administrator or the like via the management console 108.

The processing is started when a system configuration request is instructed by the administrator or the like to the management console 108 (S1501).

First, in the management module 105, when the system component management means 133 receives a system configuration request input to the management console 108, system configuration request analysis processing for analyzing contents thereof is executed (S1502). Specifically, when the system component request accepting means 701 receives the system configuration request, the system configuration request accepting means 701 transmits the received system configuration request to the system configuration request analysis means 702. The system configuration request analysis means 702 analyzes contents included in the received system configuration request. The system configuration request analysis means 702 extracts information on the logical system and information on the operating condition, power systems, and processing module included in the system configuration request, and transmits the extracted pieces of information to the module selection means 703.

Next, the module selection means 703 executes configuration module selection processing for selecting the processing module for constituting the logical system, based on the pieces of information received from the system configuration request analysis means 702 (S1503). Specifically, the module selection means 703 acquires information on the processing module yet to be allocated to the logical system by referring to the module management table 136. Then, the module selection means 703 selects the processing module which constitutes the logical system based on the information on the processing module received from the system configuration request accepting means 701 and the acquired information on the processing module, and transmits the selected information to the power management means 134.

Subsequently, the power management means 134 executes power supply system setting processing for setting power supply systems of the set logical system (S1504). Specifically, the power management means 134 acquires information on the power systems included in the system configuration request and sets the acquired information to the power systems of the logical system to be newly set.

Next, the power management means 134 executes permissible power calculation processing for calculating permissible power of each processing module and permissible power of the entire information platform based on the received information (S1505). The processing is similar to those of FIGS. 11 and 12.

Then, the management module 105 executes table setting processing for setting the calculated information to the various tables (S1506). Upon completion of the processing, power is supplied to each of the processing modules in the information platform 109 based on the set information. Accordingly, the information platform 109 starts the processing of the set logical system. Upon completion of the processing described above, the processing of the flowchart is ended (S1507).

As described above, in the power management system according to the second embodiment of this invention, in addition to the effects of the first embodiment, it becomes possible to select the power supply module 106 for supplying power in a unit of a logical system, by setting the power supply systems of the logical system to be set in the information platform 109. With the configuration as described above, for example, also when a failure occurs in the power supply module 106, the logical system using the power supply system different from the power supply module 106 in which the failure has occurred can continue on with its processing, thereby eliminating the risk of all the logical systems being stopped due to the failure of the power supply module 106. Thus, the fault-tolerant characteristics of the power supply module 106 of the information platform 109 is improved. In particular, when multiplicity of the power supply module 106 is increased, multiplicity of the power supply system is also increased, thereby making it possible to further increase the fault-tolerant characteristics.

While the present invention has been described in detail and pictorially in the accompanying drawings, the present invention is not limited to such detail but covers various obvious modifications and equivalent arrangements, which fall within the purview of the appended claims.

What is claimed is:

1. A power management method for an information platform including: at least one processing module; a management module; a switch for coupled to the processing module and the management module; and a power supply module for supplying power to the processing module, the management module, and the switch,
the information platform causing at least one logical system constituted by the processing module to operate, the method comprising:
a first step of holding, by the management module, system configuration information indicating a correspondence between the logical system and the at least one processing module constituting the logical system;
a second step of holding, by the management module, power management information indicating a correspondence among information with which a type of the logical system can be specified, an operating condition of the logical system, and first power consumption which is power consumption for operating the logical system;
a third step of selecting, by the management module, the processing module which constitutes the new logical system specified by a configuration request of the logical system by referring to the system configuration information when receiving the configuration request;
a fourth step of calculating, by the management module, the first power consumption for operating the new logical system based on the type of the new logical system and the operating condition of the new logical system included in the configuration request, and the power management information; and
a fifth step of determining, by the management module, second power consumption to be supplied to the processing module constituting the new logical system, so that a total of all the second power consumption to be supplied to all the processing modules constituting the new logical system is less than or equal to the first power consumption for operating the new logical system, in a case where the first power consumption for operating the new logical system is less than a total of maximum power consumption to be supplied to all the processing modules constituting the new logical system.

2. The power management method according to claim 1, further comprising the steps of:
holding, by the management module, power condition management information indicating a correspondence between a power control parameter including an operation condition for operating the processing module by the second power consumption, and the second power consumption;
specifying, by the management module, the power control parameter for operating the processing module by the determined second power consumption by referring to the power condition management information;
setting, by the management module, the specified power control parameter to the processing module;
starting, by the management module, the power supply module to supply power to the processing module; and
booting up, by the management module, the processing module in accordance with the set power control parameter.

3. The power management method according to claim 2, wherein:
the operation condition includes at least one of an operation frequency and an operation voltage of the processing module; and
the power condition management information holds at least two entries including a correspondence between the second power consumption and the operation condition.

4. The power management method according to claim 1, wherein the fifth step of determining, by the management module, the second power consumption so that the second power consumption is the maximum power consumption to be supplied to the processing modules constituting the new logical system, in a case where the first power consumption for operating the new logical system is more than the total of maximum power consumption to be supplied to all the processing modules constituting the new logical system.

5. The power management method according to claim 1, further comprising the steps of:
acquiring, by the management module, maximum output power that can be supplied by the power supply module;
verifying, by the management module, whether a total of the calculated first power consumption of all the logical systems included in the information platform is exceeding the acquired maximum output power;
verifying, by the management module, whether a total of the determined second power consumption of all the processing modules constituting all the logical systems is exceeding a total of the maximum power consumption of all the processing modules constituting the logical system; and
adjusting, by the management module, the maximum output power so that the maximum output power is approximated to the total of all the first power consumption supplied from the power supply module, in a case where the total of the calculated first power consumption of all the logical systems included in the information platform does not exceed the maximum output power.

6. The power management method according to claim 1, wherein the operating condition includes information with which a processing speed of the processing module constituting the new logical system can be designated.

7. The power management method according to claim 1, wherein the operating condition includes information with which the first power consumption for operating the new logical system can be specified.

8. The power management method according to claim 1, wherein the second power consumption is set to be equal to or lower than maximum power consumption of the processing module constituting the new logical system.

9. The power management method according to claim 1, wherein:
the power supply module includes at least two power supply systems that can independently supply power through different paths; and
the method further comprises the steps of:
holding, by the management module, a system component management information indicating a correspondence between an identifier of the power supply systems for supplying power to the logical system and the processing module constituting the logical system, and the logical system;
holding, by the management module, power condition management information indicating a correspondence between a power control parameter including an operation condition for operating the processing module by the second power consumption, and the second power consumption;
specifying, by the management module, the power control parameter for operating the processing module by the determined second power consumption, by referring to the power condition management information;
setting, by the management module, the specified power control parameter to the processing module;
starting, by the management module, the power supply module included in the power supply system allocated to the new logical system supplying power to the processing module; and
booting up, by the management module, the processing module in accordance with the set power control parameter.

10. The power management method according to claim 9, wherein the configuration request of the logical system includes information on the type of the new logical system, the operating condition of the new logical system, and the power supply systems which supplies power to the logical system.

11. The power management method according to claim 1, further comprising the steps of:
providing a correspondence between the logical system and the processing module constituting the logical system;
acquiring, by the management module, the type and the operating condition of the new logical system included in the configuration request when receiving the configuration request of the logical system;
selecting, by the management module, the processing module which constitutes the new logical system specified by the configuration request based on the correspondence between the logical system and the processing module;
configuring, by the management module, the new logical system specified by the configuration request by the selected processing module; and
holding, by the management module, in the system configuration information, the correspondence between the new logical system specified by the configuration request and the selected processing module.

12. An information platform, comprising:
at least one processing module;
a management module;
a switch for coupled to the processing module and the management module; and
a power supply module for supplying power to the processing module, the management module, and the switch,
the information platform including at least one logical system constituted by the processing module, wherein the management module is configured to:
hold system configuration information indicating a correspondence between the logical system and the processing module constituting the logical system;
hold power management information indicating a correspondence among information with which a type of the logical system can be specified, an operating condition of the logical system, and first power consumption which is power consumption for operating the logical system;
select the processing module which constitutes the new logical system specified by a configuration request of the logical system by referring to the system configuration information when receiving the configuration request;
calculate the first power consumption for operating the new logical system based on the type of the new logical system and the operating condition of the new logical system included in the configuration request, and the power management information; and
determine second power consumption to be supplied to the processing module constituting the new logical system, so that a total of all the second power consumption to be supplied to all the processing modules constituting the new logical system is less than or equal to the first power consumption for operating the new logical system, in a case where the first power consumption for operating the new logical system is less than a total of maximum power consumption to be supplied to all the processing modules constituting the new logical system.

13. The information platform according to claim 12, wherein the management module is further configured to:
hold power condition management information indicating a correspondence between a power control parameter including an operation condition for operating the processing module by the second power consumption, and the second power consumption;
specify the power control parameter for operating the processing module by the determined second power consumption by referring to the power condition management information;
set the specified power control parameter to the processing module;
start the power supply module supplying power to the processing module; and
boot up the processing module in accordance with the set power control parameter.

14. The information platform according to claim 13, wherein:
the operation condition includes at least one of an operation frequency and an operation voltage of the processing module; and
the power condition management information holds at least two entries including a correspondence between the second power consumption and the operation condition.

15. The information platform according to claim 13, wherein the management module is further configured to:
acquire the type and the operating condition of the logical system included in the configuration request when receiving the configuration request of the logical system;
select the processing module which constitutes the logical system specified by the configuration request based on the correspondence between the logical system and the processing module constituting the logical system;

configure the logical system specified by the configuration request by the selected processing module; and hold, in the system configuration information, the correspondence between the logical system specified by the configuration request and the selected processing module.

16. The information platform according to claim 13, further comprising a storage device, wherein:

the management module comprises a memory;

the management module stores the system configuration information, the power management information and the power condition management information in the memory; and the management module stores in the storage device the system component management information, the power management information and the power condition management information stored in the memory every predetermined time.

17. The information platform according to claim 13, wherein the management module registers new entries on the power management information and the power condition management information, and deletes entries on the power management information and the power condition management information.

18. The information platform according to claim 12, wherein the management module is further configured to:

determine the second power consumption so that the second power consumption is the maximum power consumption to be supplied to the processing modules constituting the new logical system, in a case where the first power consumption for operating the new logical system is more than the total of maximum power consumption to be supplied to all the processing modules constituting the new logical system.

19. The information platform according to claim 12, wherein the management module is further configured to:

acquire maximum output power that can be supplied by the power supply module;

verify whether a total of the calculated first power consumption of all the logical systems included in the information platform is exceeding the acquired maximum output power;

verify whether a total of the determined second power consumption of all the processing modules constituting all the logical systems is exceeding a total of the maximum power consumption of all the processing modules constituting the logical system; and adjust the maximum output power so that the maximum output power is approximated to the total of all the first power consumption supplied from the power supply module, in a case where the total of the calculated first power consumption of all the logical systems included in the information platform does not exceed the acquired maximum output power.

20. The information platform according to claim 12, wherein the second power consumption is set to be equal to or lower than maximum power consumption of the processing module constituting the new logical system.

21. The information platform according to claim 12, wherein:

the power supply module includes at least two power supply systems that can independently supply power through different paths; and the management module is further configured to:

hold a system component management information indicating a correspondence between an identifier of the power supply systems for supplying power to the logical system and the processing module constituting the logical system, and the logical system;

hold power condition management information indicating a correspondence between a power control parameter including an operation condition for operating the processing module by the second power consumption, and the second power consumption;

specify the power control parameter for operating the processing module by the determined second power consumption, by referring to the power condition management information;

set the specified power control parameter to the processing module;

start the power supply module included in the power supply system allocated to the logical system supplying power to the processing module; and boot up the processing module in accordance with the set power control parameter.

22. The information platform according to claim 21, wherein the configuration request of the logical system includes information on the type of the new logical system, the operating condition of the new logical system, and the power supply systems which supplies power to the logical system.

23. The information platform according to claim 12, wherein the management module is further configured to:

measure a first load for the processing module;

calculate a second load for the logical system based on a result of the measured first load;

change the operation condition of the processing module constituting the logical system to change the second power consumption, when receiving an optimizing request for the second load is; and change the first power consumption of the logical system constituted by the processing module by supplying the changed second power consumption to the processing module.

* * * * *